United States Patent
Keßler

(10) Patent No.: US 11,761,470 B2
(45) Date of Patent: Sep. 19, 2023

(54) LENGTH-ADJUSTABLE ASSEMBLY COMPRISING A CONNECTING ELEMENT, METHOD OF MANUFACTURING THE ASSEMBLY

(71) Applicant: STABILUS GMBH, Koblenz (DE)

(72) Inventor: Jonathan Keßler, Großholbach (DE)

(73) Assignee: STABILUS GMBH, Koblenz (DE)

( * ) Notice: Subject to any disclaimer, the term of this patent is extended or adjusted under 35 U.S.C. 154(b) by 217 days.

(21) Appl. No.: 17/340,152

(22) Filed: Jun. 7, 2021

(65) Prior Publication Data
US 2021/0381539 A1    Dec. 9, 2021

(30) Foreign Application Priority Data
Jun. 9, 2020    (DE) .................... 10 2020 115 326.0

(51) Int. Cl.
| | | |
|---|---|---|
| *F16B 21/07* | (2006.01) | |
| *F16B 21/06* | (2006.01) | |
| *E05F 5/02* | (2006.01) | |
| *F16F 9/54* | (2006.01) | |

(52) U.S. Cl.
CPC ............ *F16B 21/076* (2013.01); *E05F 5/025* (2013.01); *F16B 21/065* (2013.01); *F16F 9/54* (2013.01)

(58) Field of Classification Search
CPC ... B60G 7/005; B60G 2204/416; E05F 5/022; E05F 5/025; F16B 21/065; F16B 21/07; F16B 21/073; F16B 21/076; F16C 7/026; F16C 11/0685; F16C 11/0695; F16F 9/54; Y10T 403/32196; Y10T 403/5766

USPC ..................................................... 430/76, 310
See application file for complete search history.

(56) References Cited

U.S. PATENT DOCUMENTS

| | | | | |
|---|---|---|---|---|
| 5,265,495 A | * | 11/1993 | Bung .................. | F16C 11/0685 403/120 |
| 6,164,860 A | * | 12/2000 | Kondo ................ | F16C 11/0695 403/132 |
| 6,666,467 B2 | * | 12/2003 | Bernhardt ........... | F16C 11/0695 280/93.51 |

(Continued)

FOREIGN PATENT DOCUMENTS

| | | | | |
|---|---|---|---|---|
| DE | 3925163 A1 | * | 2/1990 | ................ F16F 9/54 |
| DE | 29506202 U1 | * | 7/1995 | .......... F16C 11/0695 |

(Continued)

*Primary Examiner* — Josh Skroupa
(74) *Attorney, Agent, or Firm* — Schmeiser, Olsen & Watts, LLP

(57) ABSTRACT

A length-adjustable assembly and method including a connecting element for connecting the assembly to a component so that the connection can be subjected to tensile loads and compressive loads, the connecting element being plugged along the longitudinal axis onto an axial end section with respect to the longitudinal axis of the assembly. The connecting element includes a latching arm elastically bendable outwardly with respect to the longitudinal axis in a mounting configuration of the connecting element for plugging the connecting element onto the end portion, wherein the latching arm includes a latching element, wherein the latching element to positively cooperate with a mating latching element of the end portion, the mating latching element of complementary shape to the latching element, in an operating configuration of the connecting element fitted onto the end portion along the longitudinal axis.

11 Claims, 2 Drawing Sheets

(56) References Cited

U.S. PATENT DOCUMENTS

Figure 1:
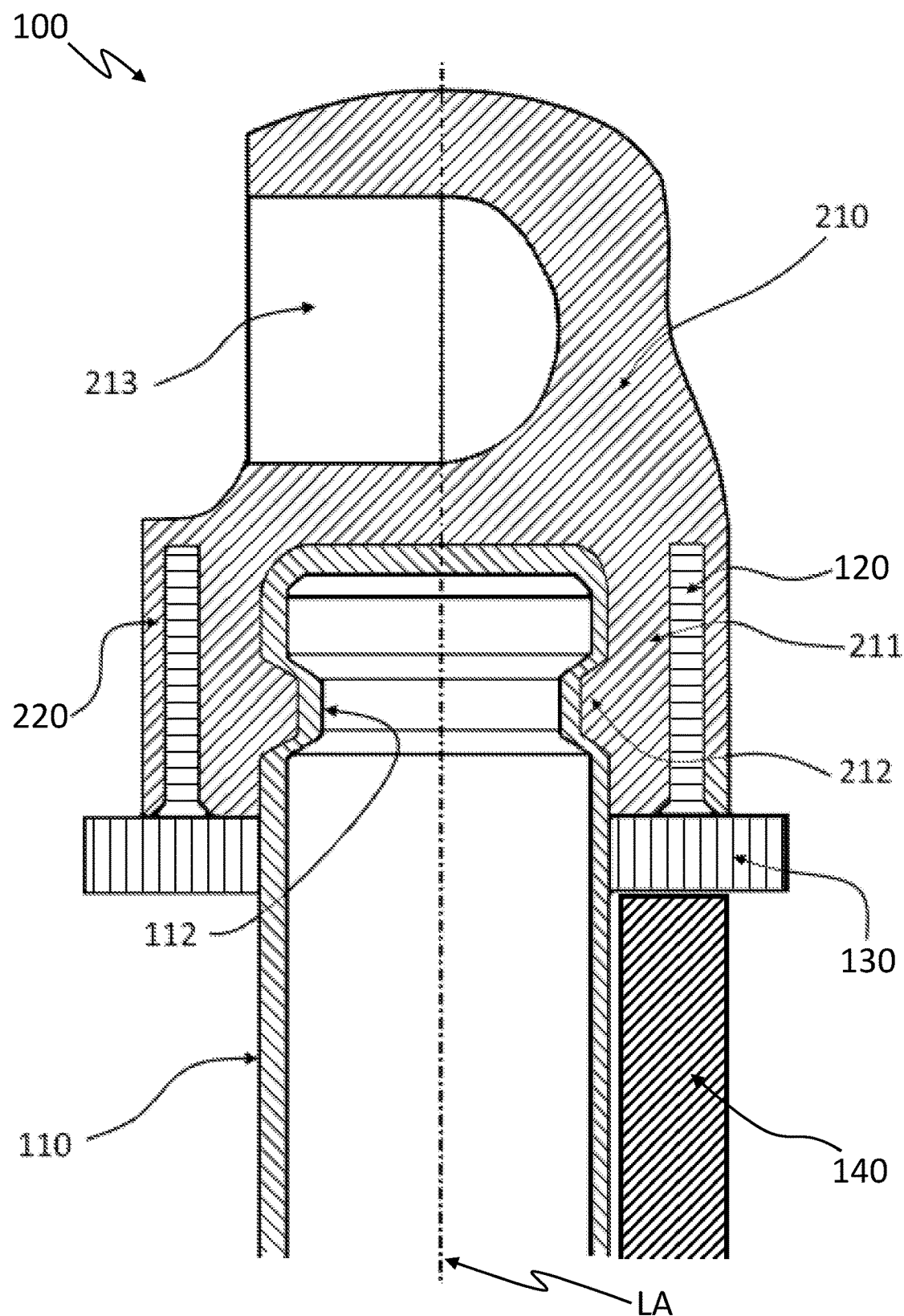

| | | | |
|---|---|---|---|
| 6,748,820 B2* | 6/2004 | Ruhlander | F16C 11/04 403/141 |
| 6,941,656 B2* | 9/2005 | Michioka | F16C 11/0671 29/898.047 |
| 7,226,233 B2 | 6/2007 | Sussenbach et al. | |
| 7,226,234 B2* | 6/2007 | Gordy | F16C 11/04 403/143 |
| 8,127,634 B2* | 3/2012 | Reif | F16D 7/021 74/89.34 |
| 8,516,921 B2* | 8/2013 | Gordy | F16C 11/04 24/675 |
| 8,662,236 B2* | 3/2014 | Koestler | F16C 11/0623 403/135 |
| 9,021,917 B2* | 5/2015 | Koontz | F16C 1/14 74/502.6 |
| 9,353,836 B2* | 5/2016 | Anheier | F16H 57/031 |
| 9,360,077 B2* | 6/2016 | Bochen | F16F 9/54 |
| 9,598,889 B2* | 3/2017 | Löhken | E05F 5/022 |
| 10,295,012 B2* | 5/2019 | Theis | F16H 25/24 |
| 10,352,350 B2* | 7/2019 | Rake | F16C 1/14 |
| 10,358,855 B2* | 7/2019 | Dietzel | F16F 9/54 |
| 2005/0076484 A1 | 4/2005 | Sussenbach et al. | |

FOREIGN PATENT DOCUMENTS

| | | | |
|---|---|---|---|
| DE | 4434787 A1 | 4/1996 | |
| DE | 100 46 961 A1 | 4/2001 | |
| DE | 20315778 U1 | 12/2003 | |
| DE | 10 2007 031 320 A1 | 1/2009 | |
| DE | 10 2012 201 174 A1 | 8/2013 | |
| DE | 102018124493 A1 * | 4/2020 | F16C 11/0685 |
| EP | 2 311 672 B1 | 12/2014 | |

* cited by examiner

LENGTH-ADJUSTABLE ASSEMBLY COMPRISING A CONNECTING ELEMENT, METHOD OF MANUFACTURING THE ASSEMBLY

CROSS-REFERENCE TO RELATED APPLICATIONS

This application claims priority to DE 10 2020 115 326.0, having a filing date of Jun. 9, 2020, the entire contents of which are hereby incorporated by reference.

FIELD OF TECHNOLOGY

The following relates to a length-adjustable assembly comprising a connecting element for connecting the assembly to a component in such a way that the connection can be subjected to tensile loads and compressive loads, the connecting element being plugged along the longitudinal axis onto an axial end section with respect to the longitudinal axis of the assembly. The following further relates to a method for manufacturing such an aggregate.

BACKGROUND

Such assemblies with corresponding connection elements are used, for example, in the form of spindle drives/linear drives, spring struts, fluid dampers and gas springs, especially in the motor vehicle sector, e.g. for opening, holding and/or closing tailgates, doors, engine bonnets etc.

From DE 10 2012 201 174 A1, an assembly of the type mentioned above is known. The variable-length assembly comprises an outer component formed by an outer tube. A connecting element is arranged at a mounting end of the outer tube. An attachment of the tube has a circumferential groove in which a circumferential web engages to rotatably retain the connecting element on the tube. The connecting element can be rotatably retained on the tube by a snap ring arranged in a circumferential groove of the tube and a circumferential groove of the connecting element. However, this solution leads to a complicated and long manufacturing process and is therefore not satisfactory.

SUMMARY

An aspect relates to an assembly of the type mentioned at the beginning, which enables simple and quick assembly with a stable connection.

A connecting element according to embodiments of the invention is designed for the tension-loadable and compression-loadable connection of an assembly which is adjustable in length along a longitudinal axis, for example a gas pressure spring, a fluid damper, a linear actuator, in particular a spindle actuator or a spring strut, to a component, for example a body or a flap of a vehicle.

The connecting element is designed to be plugged along the longitudinal axis onto an axial end section with respect to the longitudinal axis of the assembly. The end section can, for example, be tubular, in particular cylindrical and/or coaxial to the longitudinal axis.

The connecting element comprises at least one latching arm elastically bendable outwardly with respect to the longitudinal axis in a mounting configuration of the connecting element for pugging onto the end portion, wherein the at least one latching arm comprises at least one latching element, wherein the at least one latching element is adapted to positively cooperate along the longitudinal axis with at least one mating latching element of the end portion shaped complementarily to the latching element in an operating configuration of the connecting element fitted onto the end portion.

The use of latching elements and counter-latching elements allows a significantly easier assembly of the connection element. The latching arm(s) and/or latching element(s) can be designed in such a way that they are elastically deformable radially outwards (in relation to the longitudinal axis) in the mounting configuration in order to latch into the mating latching element(s). The latching arm(s) and/or latching element(s) may be further configured such that in the operating configuration they are not elastically deformable radially outwardly (with respect to the longitudinal axis) to remain (positively) latched to the mating latching element(s). The operating configuration can be achieved, for example, by a further component mounted after engagement.

The connecting element can be subjected to tensile and compressive loads with the typical forces of a vehicle's flap drive.

The connecting element can comprise 1, 2, 3, 4, 5, 6 or more, desirably at least 2, in particular 4 latching arms, each with at least one latching element. The more latching arms are used, the easier it is to fit the connecting element onto the assembly and the more evenly it is held. However, the manufacturing effort and the risk of breakage of the latching arms also increases, which is why the use of 4 latching arms has proven to be a good compromise.

The assembly does not have to have the same number of mating latching elements as the connecting element has latching elements, but several, in particular all, latching elements can also be latched with a common mating latching element (e.g. with an annular groove running around the longitudinal axis) or vice versa.

The bendability of the latching arm(s) in the radial direction should be sufficiently great so that pushing the connecting element onto the end section of the assembly entails as little risk of breakage as possible. In an embodiment, the at least one latching arm is elastically deformable by at least 1 mm, desirably by at least 10 mm, radially (i.e. perpendicular to the longitudinal axis). In an embodiment, the at least one latching arm is elastically deformable radially (i.e., perpendicular to the longitudinal axis) by at least the radial thickness of the at least one latching element. The radial thickness of the latching element is, for example, the length by which the latching element projects radially from the latching arm (in particular inwards towards the longitudinal axis) in the non-deformed state of the latching arm. Since the latching element is not necessarily arranged at the axial end of the latching arm, a significantly higher elastic deformability of the latching arm (e.g., 1.5 times to 2 times as far radially outwards) than the radial thickness of the latching element may be necessary.

The connecting element according to embodiments of the invention is thus easy and uncomplicated to mount on the assembly, and yet an extremely stable connection of the connecting element to the assembly is achieved with respect to a tensile load or compressive load along the longitudinal axis.

In an embodiment, the connecting element is in one piece and consists or comprises of an elastically deformable, in particular fibre-reinforced, plastic, especially of a, in particular glass fibre-reinforced, polyamide. Such a plastic is easy and simple to manufacture (e.g. by injection moulding). A fibre-reinforced plastic withstands a high tensile load and compressive load in the fibre direction and remains flexible transversely to the fibre direction.

In a further embodiment, the connecting element comprises a coupling region, such as a ball socket, a ball pin, an eye or a bolt, for coupling, which can be subjected to tensile loads and compressive loads, rotatable about at least one axis of rotation, with a coupling element of complementary shape to the coupling region, a ball socket, a ball pin, an eye or a bolt, of the component. This enables the connection of the assembly via the coupling element to a component (e.g. a tailgate) with a single (i.e., one-piece) connecting element. Thus, the assembly comprises few individual parts and the construction is simple and inexpensive.

The assembly according to embodiments of the invention is adjustable in length along a longitudinal axis and can be designed, for example, as a gas pressure spring, hydraulic damper, linear drive, in particular spindle drive, or spring strut.

The assembly is equipped with at least one connection element, in particular according to embodiments of the invention, for connecting the assembly to a component, for example a body or a flap of a vehicle, in such a way that the connection can be subjected to tensile loads and compressive loads.

The connecting element is plugged onto an axial end section with respect to the longitudinal axis of the assembly, wherein the connecting element comprises at least one latching arm which is elastically bendable outwards with respect to the longitudinal axis in a mounting configuration of the connecting element for plugging onto the end section. The end section can, for example, be tubular, in particular cylindrical and/or coaxial with the longitudinal axis.

The at least one latching arm comprises at least one latching element, the end portion comprising at least one mating latching element complementarily shaped to the at least one latching element, wherein the at least one latching element positively cooperates with the at least one mating latching element along the longitudinal axis in an operating configuration of the assembly.

The advantages and design options already described for the connection element according to embodiments of the invention result from the design of the assembly according to embodiments of the invention.

In an embodiment, the at least one latching element cooperates with the at least one counter-latching element in a rotatable manner about the longitudinal axis in the operating configuration of the assembly. For this purpose, the at least one mating latching element can, for example, have rotational symmetry about the longitudinal axis. In an embodiment, the latching element and the mating latching element are rotatable relative to each other about the longitudinal axis by 360°. An example of this is a mating latching element in the form of a circumferential annular groove into which the latching element(s) latch, whereby a relative rotation of the connecting element to the end section (or the rest of the assembly) is possible.

In an embodiment, the at least one latching element comprises a projection for engagement in the mating latching element designed as a recess, as an annular groove running around the longitudinal axis. This embodiment enables a simple assembly and a relative rotatability of the latching element and the mating latching element in an uncomplicated manner. Furthermore, there is usually more material thickness and installation space available in the end section than in the latching arm. It is therefore safer, more space-saving and easier to manufacture a recess in the end section than in the connecting element.

In an embodiment, the assembly comprises at least one securing element, the securing element being arranged to prevent the at least one latching arm of the connecting element from bending outwards with respect to the longitudinal axis in the operating configuration of the assembly. The term "prevent" is to be understood here as meaning that the latching arm(s) can be bent at most only to such an extent that the positive connection between the latching element(s) and the mating latching element(s) along the longitudinal axis is maintained in the operating configuration.

In one embodiment, in the operating configuration, the securing element is fitted onto the connecting element or inserted into the connecting element radially to the longitudinal axis on the outside of the at least one latching arm, along the longitudinal axis, the securing element and the connecting element interacting in the operating configuration along the longitudinal axis in a frictionally locking manner and/or radially to the longitudinal axis in a form-fitting manner. This allows the at least one latching arm to be elastically bent open in the mounting configuration for mounting the connecting element onto the end portion. In the operating configuration, i.e. when the securing element is in position, the at least one latching arm cannot be bent open, and is thus secured against detachment of the latching element and the mating latching element from each other.

It is advantageous if the connecting element comprises at least one protective section arranged radially to the longitudinal axis outside of the securing element in the operating configuration for protection and for frictionally holding the securing element along the longitudinal axis. In this way, a tight fit of the securing element in the connecting element can be achieved in the operating configuration. The securing element then occupies in the operating configuration the space into which the latching arm(s) can elastically bend radially outwards in the mounting configuration.

In an embodiment, the at least one securing element and the at least one protective section are each substantially hollow-cylindrical and/or arranged coaxially to the longitudinal axis. In an embodiment, the at least one securing element and the at least one protective section are hollow-cylindrical and arranged coaxially to the longitudinal axis. This solution is easy to manufacture and, due to the rotational symmetry about the longitudinal axis, easy to assemble and particularly stable.

In one embodiment, the assembly comprises at least one spring element acting along the longitudinal axis, wherein the spring element biases the securing element along the longitudinal axis against the connecting element in the operating configuration of the assembly. In an embodiment, the spring element is a helical compression spring. In an embodiment, the spring element can be a spring element already present on the assembly.

In an embodiment, the assembly comprises at least one support element, attached to the securing element or formed integrally with the securing element, for supporting the securing element on the end section and/or on the spring element, wherein the at least one support element is arranged in the shape of an annular disc and/or coaxially to the longitudinal axis and/or has a greater width radially to the longitudinal axis than the securing element. The support element serves as a guide aid for inserting the securing element into or onto the connecting element along the longitudinal axis. An annular disc-shaped design is easy to manufacture and provides uniform stabilisation. The fact that the support element has a greater width radially to the longitudinal axis than the securing element provides a larger bearing surface for the spring element. The spring element is thus stabilised and slipping during assembly and operation is prevented.

A method according to embodiments of the invention for producing the assembly according to embodiments of the invention comprises the following steps, in particular in the order mentioned:

a) providing the end section of the assembly,
b) producing at least one mating latching element on the end section and
c) plugging the connection element of the assembly along the longitudinal axis of the assembly onto the end section,
d) wherein the at least one latching arm of the connection element is bent outwards with respect to the longitudinal axis during the step of plugging-on, and
e) wherein the at least one latching arm bends back elastically towards the longitudinal axis at the end of the step of plugging-on, so that the at least one latching element of the at least one latching arm cooperates in a form-fitting manner with the at least one mating latching element along the longitudinal axis.

The creation of the counter-engagement element, for example formed as an annular groove around the longitudinal axis of the assembly, comprises a forming of the end section, for example a cold forming, in particular a beading.

In an embodiment, at least one securing element is attached to the connecting element so that the securing element prevents the at least one latching arm from bending outwards with respect to the longitudinal axis. By attaching the securing element, the transition from the mounting configuration to the operating configuration of the assembly is achieved.

It is advantageous if the attachment of the at least one securing element comprises an insertion of the securing element into the connecting element or a fitting of the securing element onto the connecting element along the longitudinal axis. For example, the securing element can be inserted into a recess in the connecting element radially outside the latching arm(s) and radially inside the protective section (if present). If no protective section is provided, the securing element is fitted onto the connecting element.

BRIEF DESCRIPTION

Figure 2:
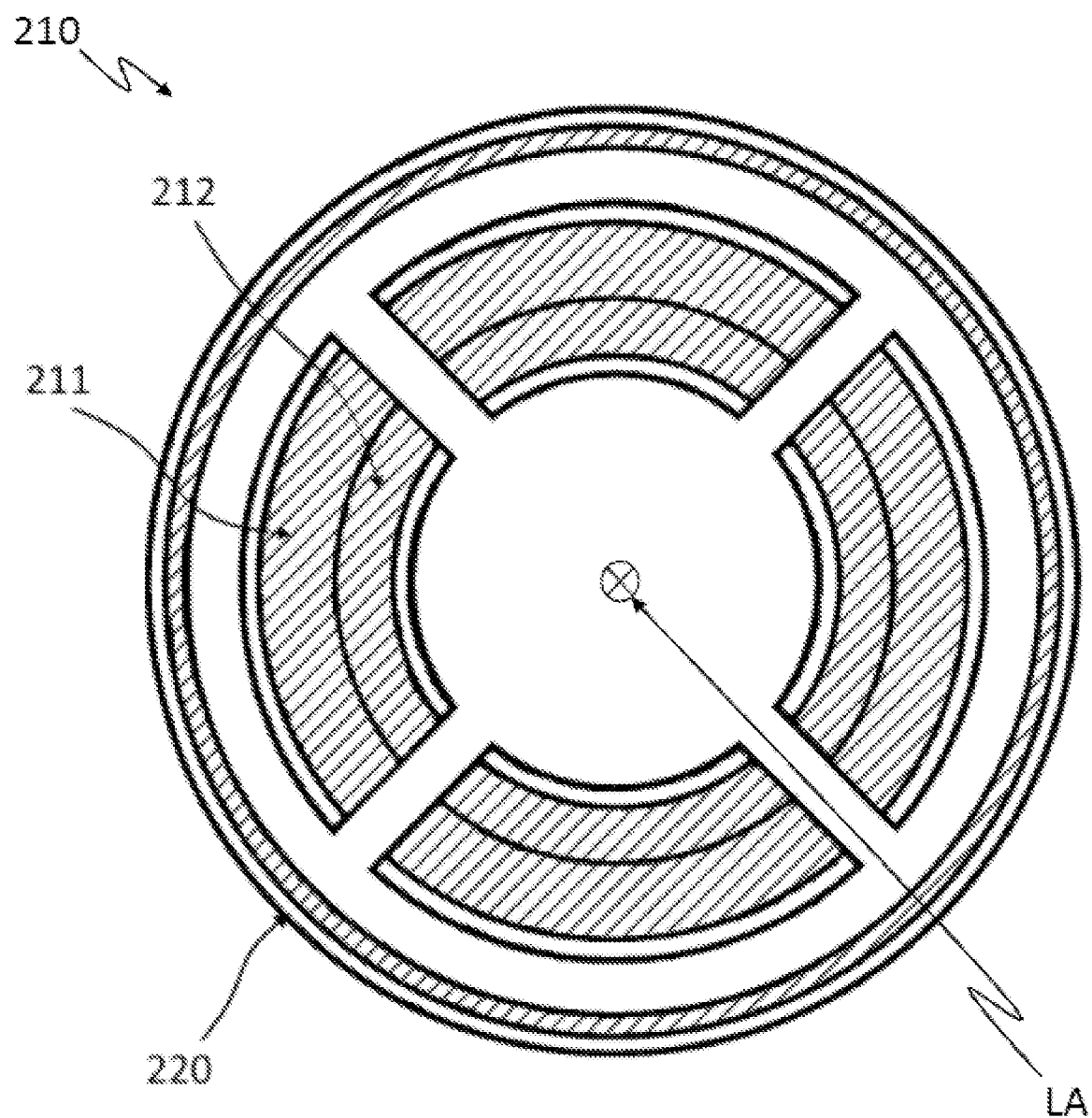

Some of the embodiments will be described in detail, with reference to the following figures, wherein like designations denote like members, wherein:

FIG. 1 shows a longitudinal section of an assembly according to embodiments of the invention; and FIG. 2 shows a cross-section of a connecting element according to embodiments of the invention.

DETAILED DESCRIPTION

FIG. 1 shows a longitudinal section of an assembly 100 according to embodiments of the invention, for example a spindle drive, along its longitudinal axis LA.

The assembly 100 comprises a connection element 210 according to embodiments of the invention for connecting the assembly 100 to a component, for example to a body of a vehicle (not shown), in such a way that the connection can be subjected to tensile loads and compressive loads.

The assembly 100 comprises a coupling region 213, for example a ball socket, for tensile-loadable and compressive-loadable coupling, rotatable about at least one axis of rotation, for example transversely to the longitudinal axis LA, with a coupling element (not shown) of the component, for example a ball stud, which is shaped complementarily to the coupling region 213.

The connection element 210 is plugged onto an axial end section 110 with respect to the longitudinal axis LA of the assembly 100. For example, the end portion 110 is configured as a substantially cylindrical tube coaxial with the longitudinal axis LA.

The connection element 210 comprises at least one latching arm 211 which is elastically bendable outwardly with respect to the longitudinal axis LA in a mounting configuration (not shown) of the connection element 210 for plugging onto the end section 110, wherein the at least one latching arm 211 comprises at least one latching element 212, for example a latching nose.

The end section 110 comprises a mating latching element 112 of complementary shape to the at least one latching element 212, for example an annular groove extending around the longitudinal axis LA.

The at least one latching element 212 cooperates with the at least one counter-latching element 112 in an operating configuration of the assembly 100 shown in FIG. 1 along the longitudinal axis LA in a form-fitting manner and rotatably about the longitudinal axis LA.

The connection element shown comprises a securing element 120 adapted to prevent the at least one latching arm 211 of the connection element 210 from bending outwardly with respect to the longitudinal axis LA in the operating configuration of the assembly 100. The assembly 100 comprises a spring element 140 acting along the longitudinal axis LA, wherein the spring element 140 biases the securing element 120 along the longitudinal axis LA against the connecting element 210 in the operating configuration of the assembly 100.

In the operating configuration shown, the securing element 120, which is configured, for example, as a cylindrical sleeve, is inserted into the connecting element 210 on the outside of the at least one latching arm 211 radially to the longitudinal axis LA, in particular coaxially to the longitudinal axis LA, the securing element 120 and the connecting element 210 interacting, for example, in the operating configuration along the longitudinal axis LA in a frictionally locking manner and radially to the longitudinal axis LA in a form-fitting manner.

The connecting element 210 comprises a protective section 220 arranged on the outside of the securing element 120 radially to the longitudinal axis LA in the operating configuration for protecting and frictionally retaining the securing element 120 along the longitudinal axis LA.

The assembly 100 comprises a support element 130 for supporting the securing element 120 at the end portion 110, wherein the support element 130 is annular and arranged coaxially to the longitudinal axis LA and has a greater width radially to the longitudinal axis LA than the securing element 120.

FIG. 2

FIG. 2 shows a cross-section of a connecting element 210 according to embodiments of the invention transverse to the longitudinal axis LA.

The connection element 210 can, for example, be designed like the connection element 210 shown in FIG. 1.

The connection element 210 comprises, for example, four latching arms 211 evenly distributed around the longitudinal axis LA, each with a latching element 212.

The connection element 210 comprises a protective section 220, for example cylindrical and arranged coaxially to the longitudinal axis LA outside the latching arms 211.

| List of reference signs | | | |
|---|---|---|---|
| 100 | Assembly | 210 | Connecting element |
| 110 | End section | 211 | Latching arm |
| 112 | Counter latching element | 212 | Latching element |
| 120 | Securing element | 213 | Coupling region |
| 130 | Support element | 220 | Protective section |
| | | LA | Longitudinal axis |

The invention claimed is:

1. An assembly which is adjustable in length along a longitudinal axis, comprising:
   a) at least one connecting element for the connection of the assembly to a component in such a way that the connection can be subjected to tensile loads and compressive loads,
   b) the at least one connecting element being plugged onto an axial end section with respect to the longitudinal axis of the assembly,
   c) the at least one connecting element comprising at least one latching arm which, in a mounting configuration of the connecting element for plugging onto the end section, is elastically bendable outwards with respect to the longitudinal axis,
   d) the at least one latching arm comprising at least one latching element,
   e) wherein the end portion comprises at least one mating latching element of complementary shape to the at least one latching element,
   f) wherein the at least one latching element positively cooperates with the at least one mating latching element along the longitudinal axis (LA) in an operating configuration of the assembly,
   g) wherein the assembly comprises at least one securing element,
   h) the securing element being set up to prevent the at least one latching arm of the at least one connecting element from bending outwards with respect to the longitudinal axis in the operating configuration of the assembly,
   i) at least one spring element acting along the longitudinal axis,
   j) the spring element biasing the at least one securing element against the connecting element along the longitudinal axis in the operating configuration of the assembly.

2. The assembly according to claim 1, wherein the connecting element is in one piece and consists of an elastically deformable, fibre-reinforced plastic.

3. The assembly according to claim 1, wherein
   a) a coupling region selected from a ball socket, a ball pin, an eye and a bolt, for coupling to a coupling element of the component,
   b) the coupling element being of complementary shape to the coupling region and being selected from a ball socket, a ball pin, an eye and a bolt,
   c) wherein the coupling connection can be loaded in tension and in compression and can be rotated about at least one axis of rotation.

4. The assembly according to claim 1, wherein the at least one latching element cooperates with the at least one counter-latching element in a rotatable manner about the longitudinal axis in the operating configuration of the assembly.

5. The assembly according to claim 1, wherein the at least one latching element comprises a projection for engagement in the mating latching element configured as an annular groove extending around the longitudinal axis.

6. The assembly according to claim 1, wherein
   a) in the operating configuration, the at least one securing element is fitted along the longitudinal axis on the outside of the at least one latching arm radially to the longitudinal axis onto the at least one connecting element or is inserted along the longitudinal axis into the connecting element,
   b) wherein the at least one securing element and the at least one connecting element cooperate in a frictionally locking manner along the longitudinal axis in the operating configuration.

7. The assembly according to claim 6, wherein the at least one connection element comprises at least one protective section arranged outside the at least one securing element radially to the longitudinal axis in the operating configuration for protecting the at least one securing element and frictionally retaining the at least one securing element along the longitudinal axis.

8. The assembly according to claim 7, wherein the at least one securing element and the at least one protective section are each substantially hollow cylindrical.

9. The assembly according to claim 1, wherein
   a) at least one support element for supporting the at least one securing element on the at least one spring element,
   b) wherein the at least one support element is arranged in the shape of an annular disc and/or coaxially to the longitudinal axis and/or has a greater width radially to the longitudinal axis than the at least one securing element.

10. A method of manufacturing the assembly according to claim 1, comprising:
    a) providing the end section of the assembly,
    b) producing at least one mating latching element on the end section, and
    c) plugging the connection element of the assembly onto the end section along the longitudinal axis of the assembly,
    d) wherein the at least one latching arm of the connection element is bent outwards with respect to the longitudinal axis during the step of plugging-on, and
    e) wherein the at least one latching arm elastically bends back towards the longitudinal axis at the end of the step of plugging-on, so that the at least one latching element of the at least one latching arm cooperates positively with the at least one mating latching element along the longitudinal axis f) attaching at least one securing element to the connection element so that the securing element prevents the at least one latching arm from bending outwards with respect to the longitudinal axis,
    g) attaching at least one spring element acting along the longitudinal axis to the assembly so that the spring element biases the at least one securing element against the connecting element along the longitudinal axis in the operating configuration of the assembly.

11. The method according to claim 10, wherein the attaching of the at least one securing element comprises a plugging of the securing element into the connecting element or a plugging of the securing element onto the connecting element along the longitudinal axis.

* * * * *